Figure 3:
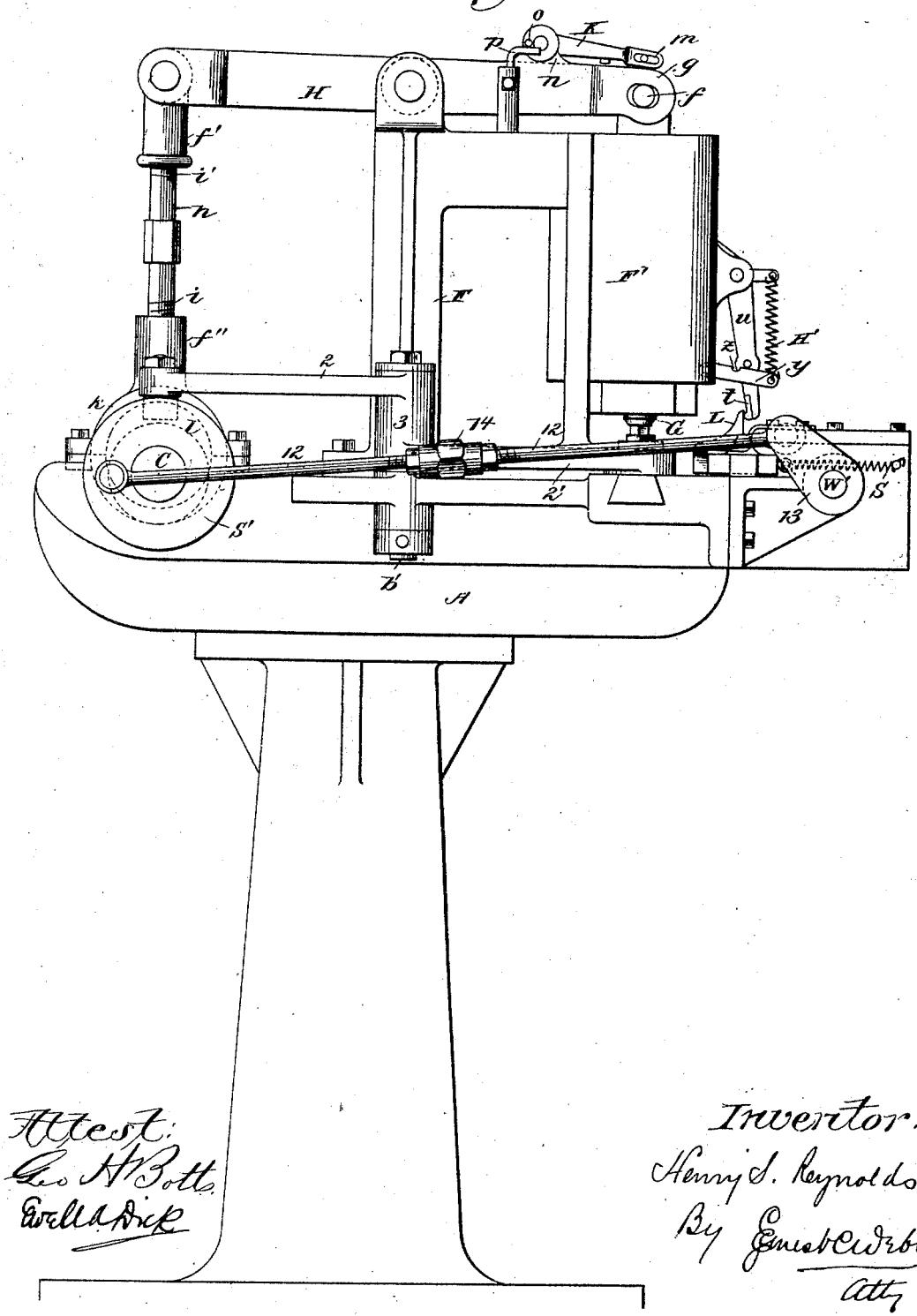

(No Model.) 7 Sheets—Sheet 1.
H. S. REYNOLDS.
MACHINERY FOR MAKING SOLID OR TUBULAR RIVETS.
No. 503,329. Patented Aug. 15, 1893.
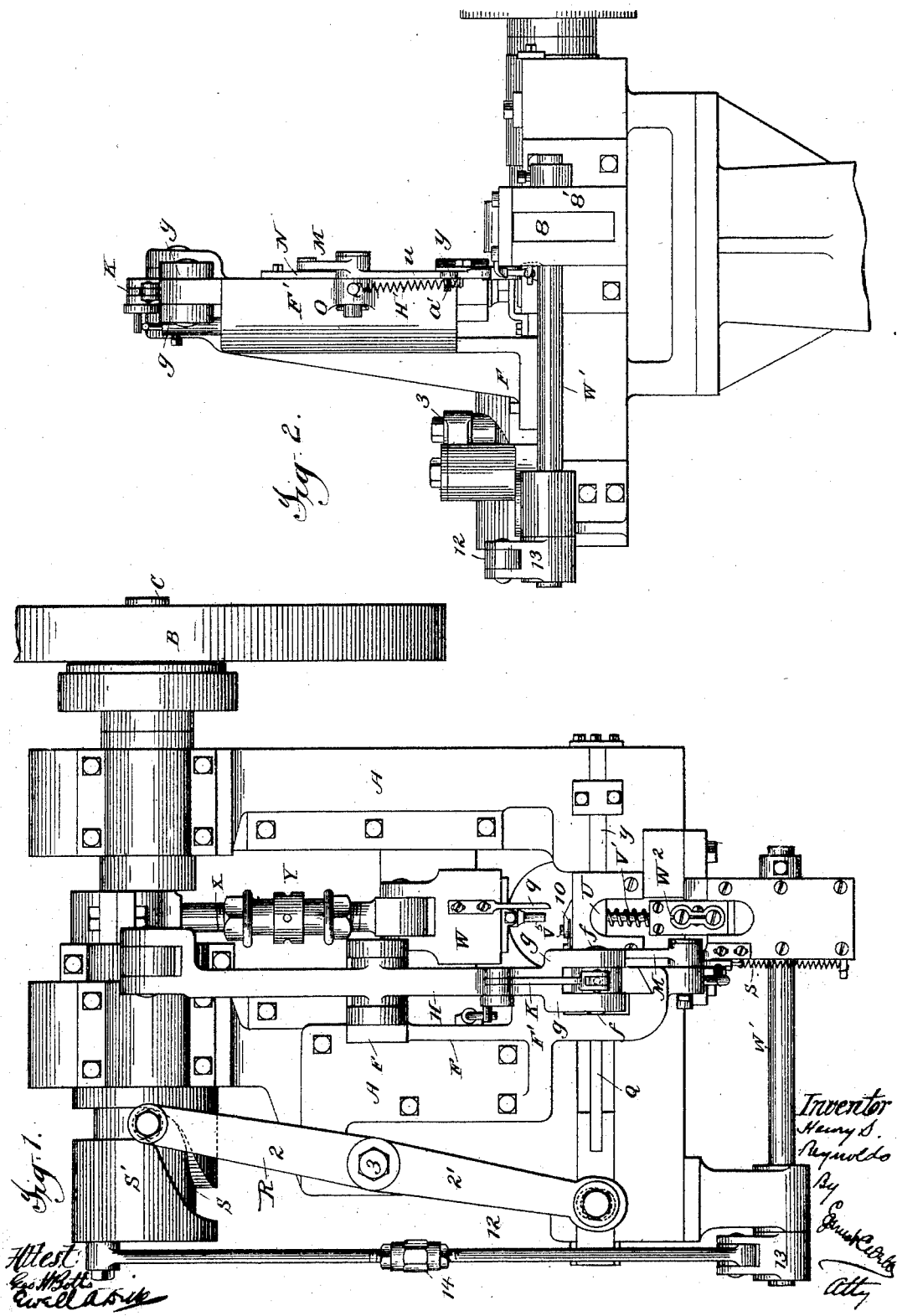

(No Model.) 7 Sheets—Sheet 2.
H. S. REYNOLDS.
MACHINERY FOR MAKING SOLID OR TUBULAR RIVETS.

No. 503,329. Patented Aug. 15, 1893.

Attest:
Geo. H. Bott
Evell A. Dick

Inventor:
Henry S. Reynolds
By Ensob C. Webb
Atty (No Model.) 7 Sheets—Sheet 3.
H. S. REYNOLDS.
MACHINERY FOR MAKING SOLID OR TUBULAR RIVETS.
No. 503,329. Patented Aug. 15, 1893.
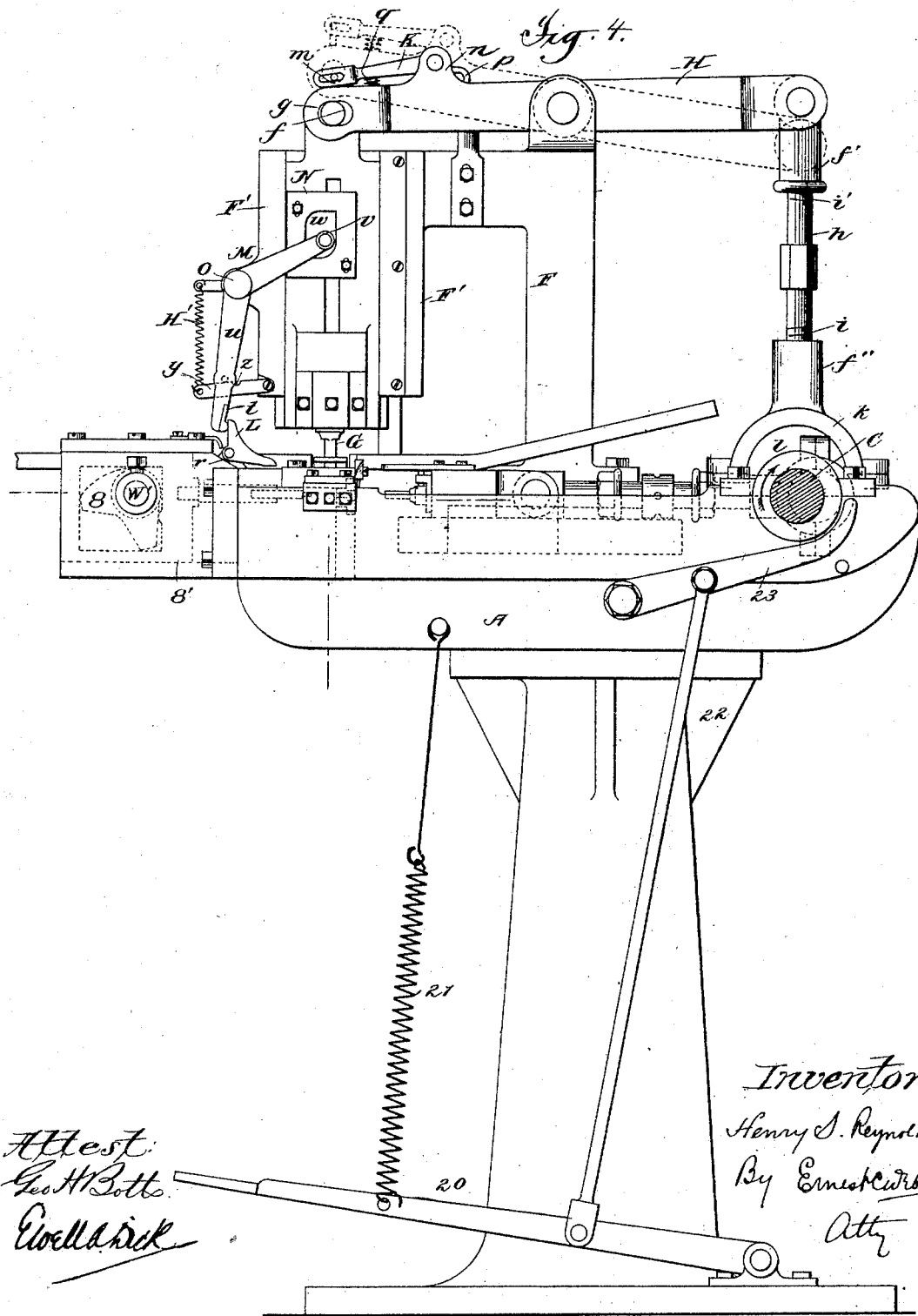
Attest:
Geo. H. Bott
Ewell A. Dick
Inventor:
Henry S. Reynolds
By Ernest C. Webb
Atty

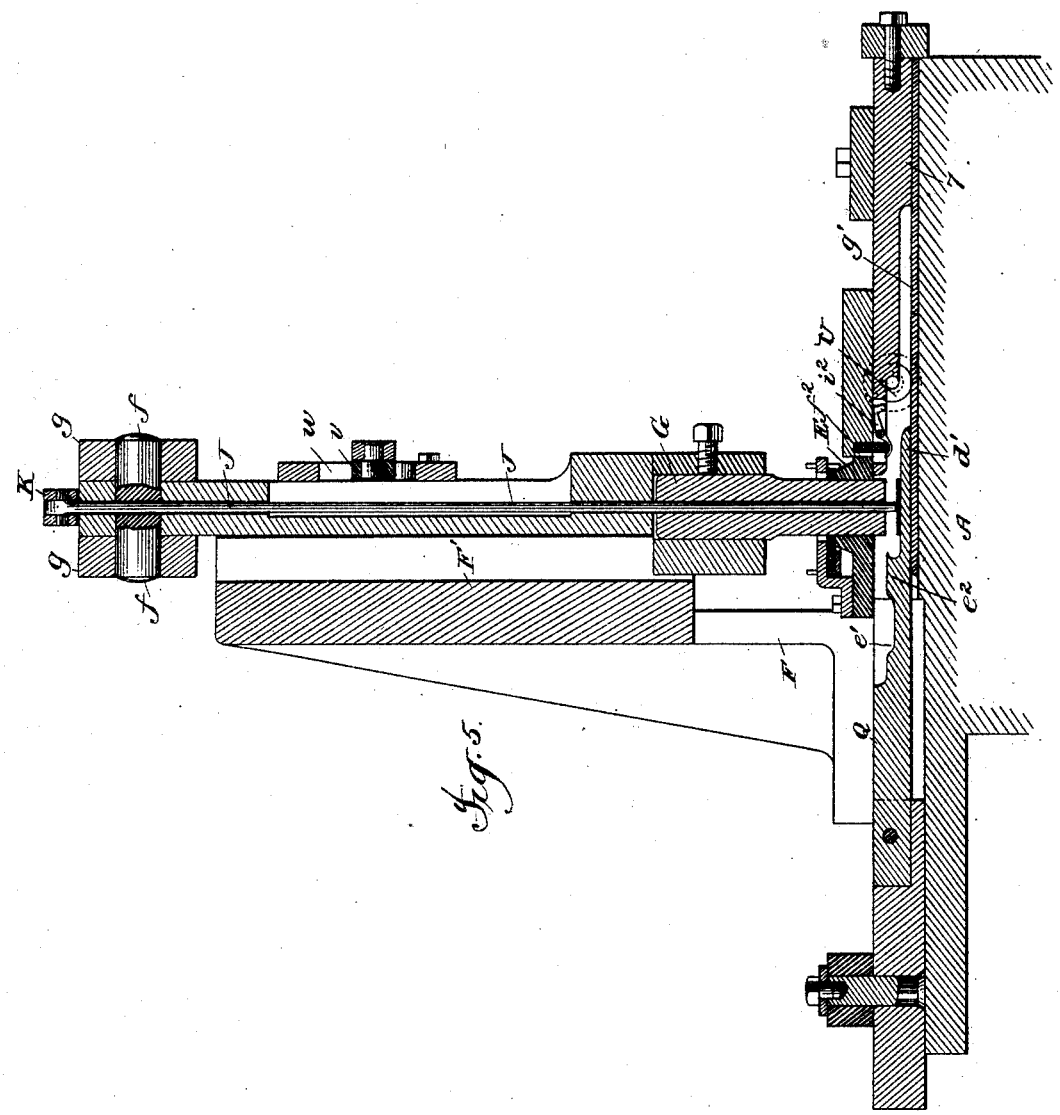

(No Model.)
7 Sheets—Sheet 5.
H. S. REYNOLDS.
MACHINERY FOR MAKING SOLID OR TUBULAR RIVETS.
No. 503,329. Patented Aug. 15, 1893.
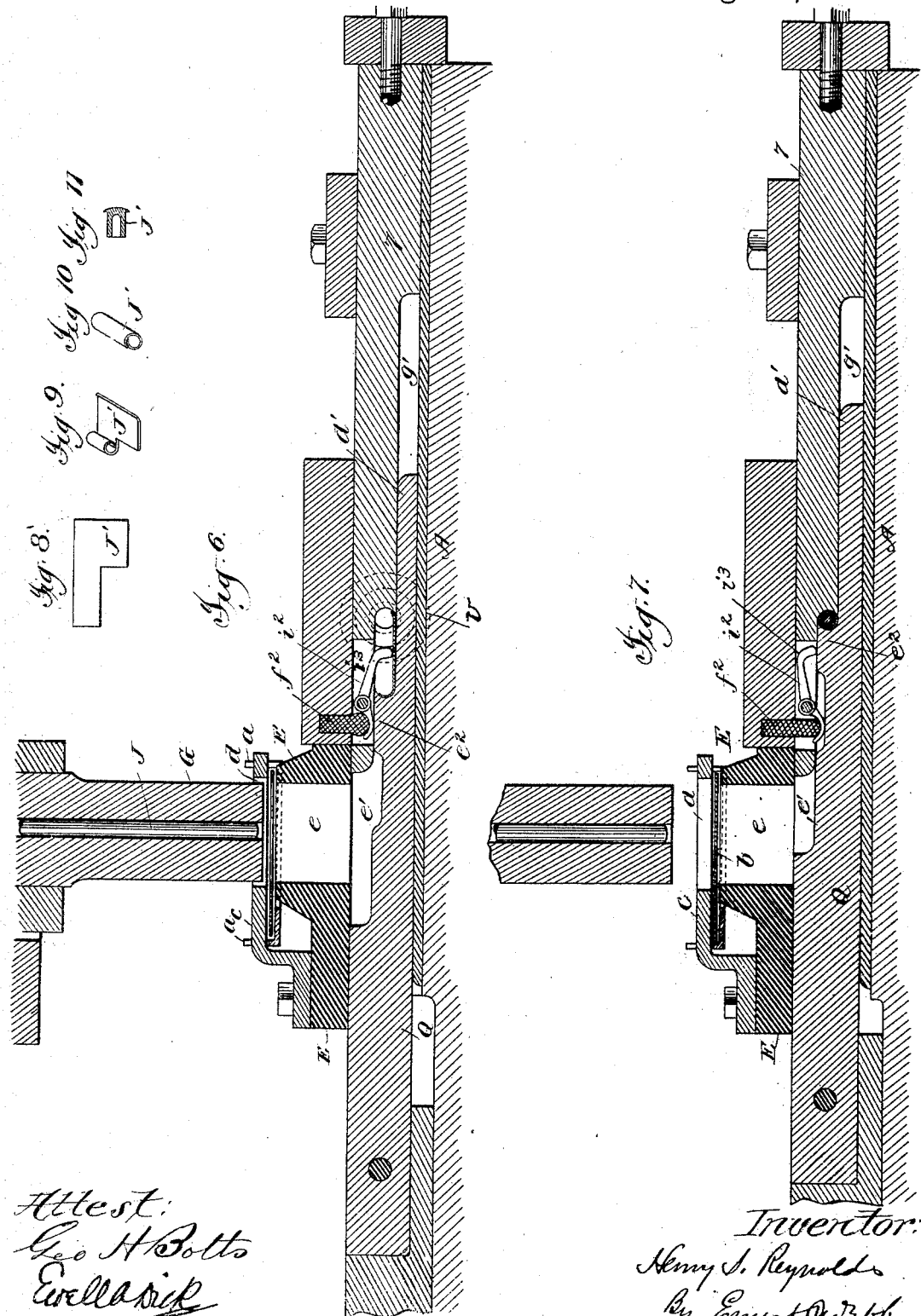
Attest:
Geo. H. Botts
Ewell a Dick
Inventor:
Henry S. Reynolds
By Ernest Webb
Atty (No Model.) 7 Sheets—Sheet 6.
H. S. REYNOLDS.
MACHINERY FOR MAKING SOLID OR TUBULAR RIVETS.
No. 503,329. Patented Aug. 15, 1893.
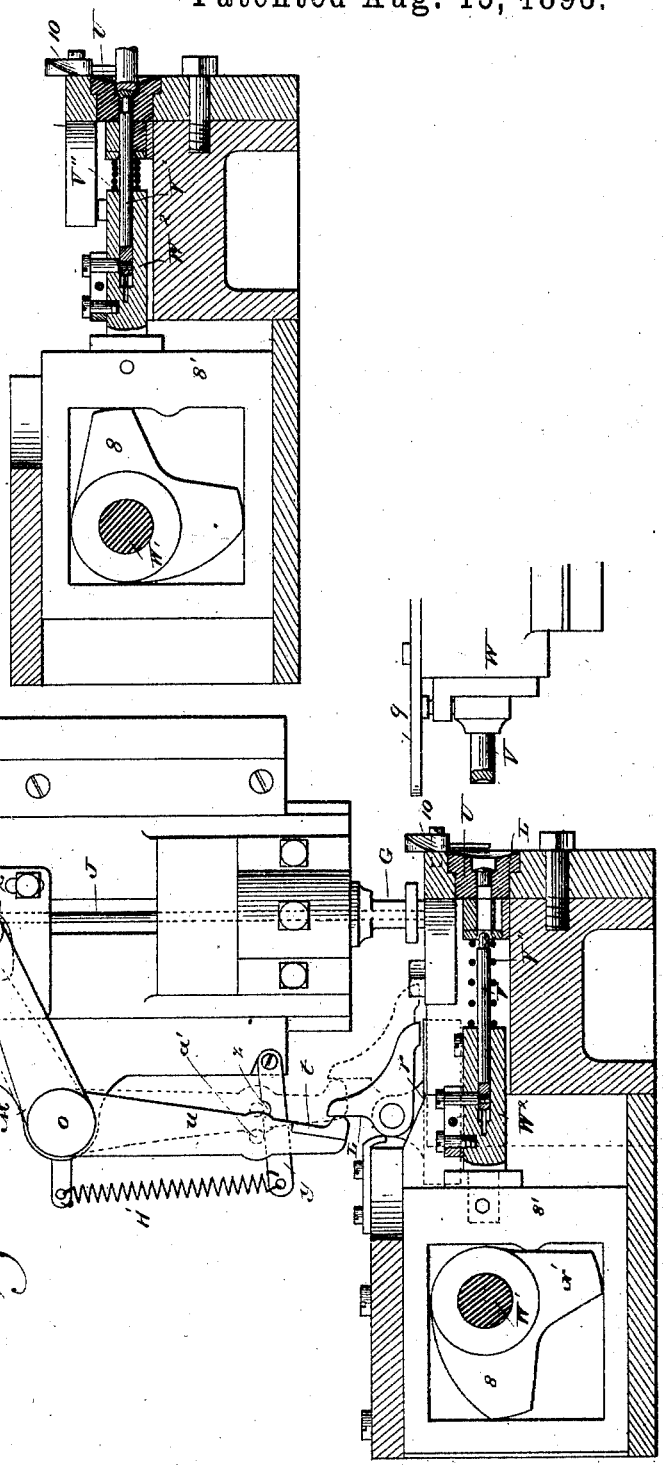
Attest:
Geo. H. Botts
E. Wallack
Inventor
Henry S. Reynolds
By Ernest C. Webb
Atty

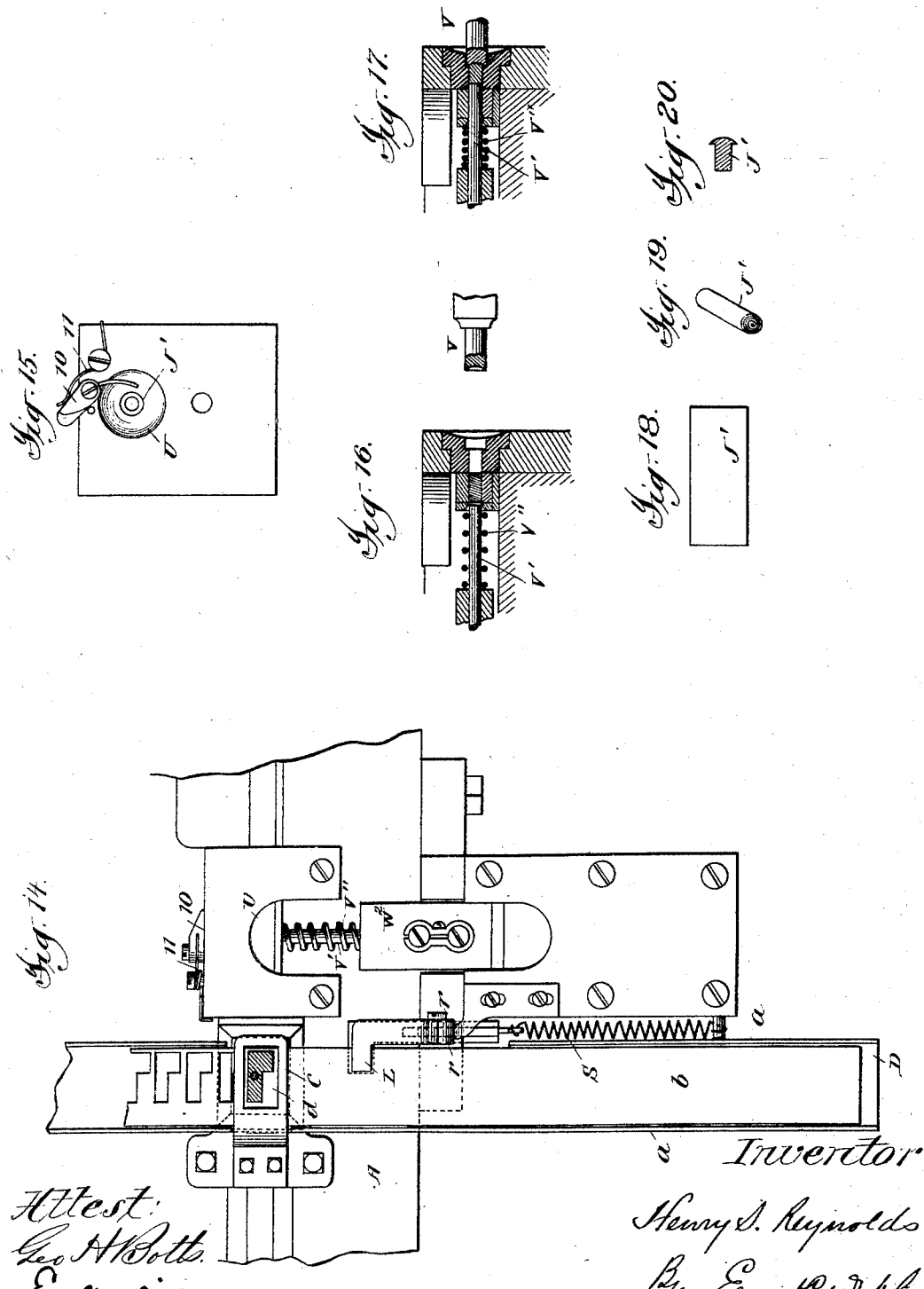

UNITED STATES PATENT OFFICE.

HENRY S. REYNOLDS, OF BROOKLYN, NEW YORK.

MACHINERY FOR MAKING SOLID OR TUBULAR RIVETS.

SPECIFICATION forming part of Letters Patent No. 503,329, dated August 15, 1893.

Application filed December 7, 1891. Renewed January 16, 1893. Serial No. 458,621. (No model.)

*To all whom it may concern:*

Be it known that I, HENRY S. REYNOLDS, a citizen of the United States, and a resident of Brooklyn, in the county of Kings and State of New York, have invented certain new and useful Improvements in Machinery for Making Solid or Tubular Rivets, of which the following is a specification.

This invention relates to the production of tubular or solid rivets from sheet metal by a series of operations involving first cutting the blank, next coiling the same, and finally swaging the coiled blank into a rivet having a solid head, and a shank (whether solid or hollow) integral with the head. A tubular rivet of this character, together with a method of making the same by the series of operations above stated, is the subject of my Letters Patent No. 479,650, of September 15, 1891.

My present invention is directed to a machine in which the series of operations constituting the patented method are automatically accomplished, said machine being adapted to produce a solid rivet as well as a tubular rivet.

The machine in which my invention is embodied is one in which a punch or cutting mechanism for cutting out the sheet metal blank, is combined with a coiling mechanism to which the blank is automatically delivered, and by which it is coiled, and a swaging mechanism to which the coiled blank produced by the coiling mechanism is delivered, and by which it is swaged and compressed into the form of a rivet having a solid head and a shank (whether tubular or solid) integral with the head. This combination of instrumentalities I believe to be broadly new with me.

Manifestly the construction of the blank cutting coiling and swaging instrumentalities can be varied without departure from the invention; and the same also is true of the means for insuring the automatic delivery of the blank from the cutting mechanism to the coiling mechanism, and of the coiled blank from the coiling mechanism to the swaging mechanism. I have in the drawings accompanying this specification and now about to be referred to, shown that form of machine embodying my invention which I on the whole prefer at present.

In the accompanying drawings in the several figures of which like parts are similarly designated, Figure 1 represents a top plan view of the complete machine; and Fig. 2 a front elevation thereof. Fig. 3 is a vertical side elevation of the machine looking from the left side of Figs. 1 and 2; and Fig. 4 is a similar view looking from the opposite side of said figures. Fig. 5 is a vertical sectional view through the center of the machine head and punch, showing also the construction and arrangement of the reciprocating coiler for giving form or shape to the blank. Figs. 6 and 7 are vertical sections on a larger scale of the punch and reciprocating coiler, showing the method or operation of forming the metal blank into a rolled-up tube ready to be upset or headed; Fig. 6 showing the blank in process of being coiled into shape, and Fig. 7 the completion of the operation with the punch in an elevated position ready to descend to strike out a new blank. Figs. 8, 9, 10 and 11 show the blank for the tubular rivet in the various stages from the plain blank in Fig. 8 to the finished rivet in Fig. 11. Fig. 12 shows a vertical side elevation of the head of the machine and the mechanism for feeding the strip of sheet metal under the punch, also representing in section the die in which the head of the rivet is shaped. Fig. 13 represents the head-forming die in enlarged detail. Fig. 14 represents a top plan view of that part of the machine in which the sheet metal strip is fed. Fig. 15 represents an enlarged detail view of the trip devices for disengaging the rivet from the die. Figs. 16 and 17 represent details of construction of the die and releasing mechanism. Figs. 18, 19 and 20 represent respectively, a form of blank, a coiled blank, and the complete rivet, when the rivet is made solid instead of tubular.

Referring now specifically to the drawings, A represents the bed-plate of the machine on which the several operative parts are mounted or carried.

B represents the driving pulley, and C its shaft, the said shaft having its bearings in suitable standards rising from the bed-plate, as shown, and being operated by its pulley from any suitable power.

D represents a feeding trough or table that is suitably supported or held upon the bed-plate A and extends from front to rear of the machine, as shown, (see Fig. 14), the said trough being turned up at the sides so as to form the flanges a, a, for guiding the strip of sheet metal b evenly and straight as it is fed forward automatically to be brought into proper position beneath the vertically-reciprocating punch.

E represents the die through which the reciprocating punch descends and over which the strip of sheet metal glides as it is fed forward at regular intervals, and, secured to said die and overlapping the same from one side, is a metal guide c between which and the upper surface of the die the strip of sheet metal passes so that it cannot rise up when struck by the punch. This guide c is formed with an opening d of a shape corresponding to the shape of the opening e in the said die E, so that the punch passes through the same in the act of cutting or striking out a blank.

F represents the frame or body of the machine, rising up from the base-plate A, and having a depending yoke or head F', so shaped in horizontal section as to receive the punch G and permit the latter to rise and fall or reciprocate therein vertically. The said reciprocating punch is loosely supported at its upper end by means of trunnions f, f, in the bifurcated or forked end g of a beam H, the latter having its bearings in the stanchion or frame F, and receiving a vibrating motion by means of suitable mechanism connecting the rear end of said beam with the drive-shaft. Thus, it will be seen that when the walking-beam is operated to vibrate in its bearing, the said punch will be vertically reciprocated within the head F'. The mechanism which vibrates the said beam H consists of a rod h having its opposite ends formed with right and left-hand screw-threads i, i', the upper end of said rod being received by a sleeve f' loosely held or supported by the rear end of the walking beam, while the lower end thereof is received in like manner by a similar sleeve f'' formed or provided on a cam ring k which incloses a cam or eccentric l carried by the drive-shaft, as shown in the drawings. In this way, as the drive-shaft revolves, the walking-beam will be operated in the manner explained.

For the purpose of adjusting the pitch or throw of the beam, I have provided the right-and-left-hand screw-threaded rod, and, as the beam is altered, so will the extent of movement of the punch be changed. The punch in descending and cutting the blank does not carry the blank down far enough to be brought in proper position upon the reciprocating coiler Q (which is the moving member of the coiling mechanism), it being desirable that there should be no impact between said punch and coiler for the reason that the force thereof might tend to disarrange and interfere with the proper working of the shaper. It is desirable, besides, to have the punch rise or return upwardly in time for the feeder to perform its work in moving the sheet metal forward to the extent of the size of another blank. In order, therefore, to force or push the blank down upon the reciprocating coiler, after said blank has been cut or struck out by the punch, I resort to a vertically-movable or reciprocating rod J, which passes down through the punch, (see Fig. 5,) and at the moment the blank is cut this rod moves down and forces the blank downwardly and upon the coiler Q. In this way the blank is delivered from the cutting mechanism to the coiling mechanism. For the purpose of effecting this operation, it is necessary that the said rod J shall have a movement independent of the punch, and I accomplish this by suspending the upper end of the rod in slots m, formed in the forward end of a lever K, that is pivoted in bearings n formed or provided on the upper edge of the walking-beam H, the inner end of hub of said arm being formed with a projection o which works against the spring arm p supported on the top of the frame or body of the machine, as best seen in Fig. 3. The tendency of the spring arm p to hold the forward end of the lever k downwardly, so that when the punch is carried down the extent of its limit, the rod J will be operated in the manner described. As the punch rises or ascends the walking beam is drawn downwardly until the rear end thereof is brought or drawn past a horizontal line, whereupon the lever k is carried beyond or away from contact with the spring arm p, and said lever is forced upwardly from the walking beam by the action of a coiled spring q bearing or exerting its force between said beam and lever. The working or operation of these parts will be best understood on reference to Fig. 3, and it will be clearly apparent that in describing its upward movement the lever k will cause the upper end of the rod J to be brought to the forward extremity of the slots m, thus causing a lifting action upon said rod and raising the same independent of the punch. On the return or down-stroke of the punch, the operation is reversed and the rod is forced down, this movement of the rod taking place near the termination of the down stroke of the punch, and after the latter has cut out the blank from the metal sheet. As soon as one blank has been cut and left in the machine to be shaped and headed and finally ejected or dropped from the finishing die, the strip of sheet metal is fed forward the extent of another blank, and so on; and for the purpose of effecting this intermittent feeding operation I employ a foot L, having sliding bearings at r so as to permit of the same being moved back and forth in a horizontal plane at right angles to the path of the reciprocating coiler. The said foot L is normally drawn back or retracted by a spring s, and is so shaped or formed at its top as to be struck by the toe t on the lower arm u of a swinging or pivoted bell-crank lever M, the upper arm of said lever having its end provided with a friction roller $v$, which rests in a recess or opening $w$, formed in a plate N secured to the side of the upper stock of the reciprocating punch, in Figs. 2 and 12. The two side walls or edges of said recess $w$ are approximately straight or vertical, while the upper and lower edges are curved in opposite directions to each other, as seen at $x-x$, Fig. 12. The purpose of this construction is to furnish a movable connection of the lever M with the punch and, at the same time, to permit said lever to describe the movement necessary to operate the feed-shoe (in dotted lines, Fig. 12). The said lever is pivoted at O, and attached to its hub by one end is a spring H', while its lower end is attached to arm $y$ secured to the frame or body F, and having in its upper edge a notch $z$, as shown. As shown in full lines, Fig. 12, the foot L and lever M are in the positions they occupy when the punch is down, but as soon as said punch is raised or lifted the parts will assume the positions shown by the dotted lines, and the sheet metal will have been moved forward, as already explained. When the swinging lever has moved forward, a pin or projection $a'$ on the inner side thereof will drop into the notch $z$, and thereby form a stop, but on the descent of the punch the spring H' will lift the pin out of the notch and, at the same time, the reciprocating spring for the foot L will carry said foot back in an obvious manner. Immediately the blank has been cut or struck out from the strip of sheet metal the said blank is pushed down by the rod J upon the upper surface of the longitudinally-reciprocating coiler Q, which moves in a horizontal plane at right angles to the path of the upsetting or swaging devices hereinafter referred to. The said coiler is reciprocated back and forth in a suitable guide or race-way provided therefor by means of a movable lever R, one end of which is loosely connected to the outer end of the coiler, while the other end thereof plays loosely in the cam groove S formed in the circumference of cam S' carried by the end of the drive-shaft, all as shown. The said lever R is pivoted at $b'$ (Fig. 3), and for the purpose of economizing as much as possible in the amount of space occupied by the parts of the machine, it has been found desirable to break joint with the two arms 2, 2' of said lever in order that such arms be brought in different horizontal planes, whereby the desired result is attained. Therefore, the two arms of said lever are intersected by or connected with a vertical tube or sleeve 3, working on a common fulcrum which permits the lever to be moved in such manner as to communicate to the shaper Q the necessary reciprocating movement. The said coiler (see Figs. 5, 6 and 7), will be seen to have its upper surface cut out or recessed for a suitable distance from the inner end thereof, forming thereby the tongue $d'$, and the compound curved portion $e'$, which are connected or intersected by the straight or horizontal rib $e^2$. The tongue $d'$ enters a correspondingly shaped recess $g'$, formed in a fixed or stationary plate 7, which is the stationary member of the coiling mechanism, and, in so entering, the blank is rolled up into form, the operation being clearly shown in Figs. 5, 6, and 7 of the drawings.

To hold the blank down flat while the end thereof is rolling up I employ a finger $i^2$ pivoted to some fixed part of the machine and extending through a slot $i^3$ in the stationary coiling member 7 in position to bear down upon the blank. Normally the finger is held up out of contact with the blank by a spring $f^2$; but, when in the coiling operation the reciprocating coiler has moved far enough inward to bring the rib $e^2$ under the heel of the finger as seen in Fig. 6 (which is at or a little before the time the blank begins to roll up) the finger is thereby depressed against the stress of its spring and is caused to bear down upon the blank. This action continues until the rib $e^2$ has passed the heel of the finger, at which time the spring $f^2$ by its reaction lifts the finger—this lifting action taking place before the blank has coiled up far enough to be interfered with by the finger. At the conclusion of the coiling operation, the coiled blank as seen in Fig. 7 is held in a tubular case formed by the abutting concaved shoulders of the movable and stationary members of the coiling mechanism.

To deliver the coiled blank from the coiling mechanism to the swaging mechanism I make use in the present instance of the following expedient illustrated in Fig. 12. The tubular case (formed by the two members of the coiling mechanism as just explained) in which the coiled blank is contained is open at both ends. On the prolongation of its bore at one end I provide a stationary die U. And at the opposite end I place a reciprocating plunger V', which is adapted to play back and forth through the tubular coiling case in which the coiled blank is held, and in so doing to push the coiled blank out from the coiling mechanism into the die U. The two members Q, 7, of the coiling mechanism of course do not separate or move apart from the position shown in Fig. 7 until after the plunger has sufficiently advanced or pushed forward the coiled blank into the die. The plunger V' after it has advanced the coiled blank into the die, retains immovably its advanced position (indicated in Fig. 13) until the reciprocating header V operating from the other end of the die has swaged the end of the blank into a solid head—the plunger thus acting virtually as an anvil by means of which, in connection with the die U and the header V, the coiled blank is swaged into the shape of a finished rivet. The rivet thus formed remains temporarily in the die but will be ejected therefrom when the next succeeding coiled blank is delivered by the plunger V' from the coiling mechanism into the die. The header V is operated back and forth by the reciprocating head or holder W to which it is attached, as shown, and which head is actuated from a crank on the main shaft by means of the connection X, which latter is adjusted at Y so as to alter the throw of said head. The plunger V' is caused also to reciprocate in line with and opposite to the movement of header V, through the medium of a cam 8 on the rock shaft W', and serves as before explained to hold the inner end of the rivet while the head is being struck up. When the rivet is tubular the plunger V' enters the tubular part, the end thereof being smaller than the body, as shown in Fig. 12. When the rivet is to be solid, the said plunger V' is the same size throughout, as shown in Figs. 16 and 17. Immediately after the head of the rivet has been formed, the plunger V' is moved forward a short distance to loosen the rivet from the die and, in order to take up or compensate for any lost motion of said plunger, a spring V'' is arranged thereon and interposed between the die and carrier W² of the plunger. Immediately after the rivet has been formed, the parts are in the position shown in Fig. 12. The next succeeding coiled blank pushed forward into the die by the plunger V' pushes the previously formed rivet out of the die, and the header V then advances as before toward the die to form a new head on the new blank. In order to insure the certain ejectment of the rivet from the die, I provide the head W with a rod 9 which (when the header advances) comes into contact with a lever 10 pivoted on the front of the die, (see Fig. 15) and held in place by a spring 11, as shown, and this lever is thereby pushed aside so as to cause the lower end thereof to strike the head of the rivet J' should it by any chance remain and dislodge it from the die in a complete and finished state. The reciprocating head W is operated from the main shaft, as stated, as is also the rock-shaft W', which carries the cam 8 that actuates the cam-plate 8', through the medium of which the plunger V' is reciprocated. The manner of operating said rock-shaft is through the agency of a pitman or connecting rod 12, having its one end working loosely in a groove formed in the side of the cam S', which actuates the lever R, and its other end connected to a wrist-pin or eccentric 13, carried on the corresponding end of said rock-shaft. In this way the desired reciprocating movement is imparted to the plunger V'. The said pitman or connecting rod is made in two parts, as shown, which are connected together by an adjusting nut 14, so as to vary or alter the degree of movement or rocking of the shaft W', the desirability of which construction will be apparent.

From the foregoing description it is thought the construction, arrangement and operation of my invention will be fully understood, and it will of course be understood that according as the rivet is to be a tubular one, or one that is made solid by being coiled or rolled up into shape, the only change made is in the shape of the blank as well as the punch which operates upon the same, both of which have been referred to and explained. It will be apparent, also, to those skilled in the art to which my invention appertains that other means than those shown could be employed for operating the vertically-reciprocating rod J to have its movement properly timed with respect to the punch or blank cutter as well as independently of such cutter. I prefer, however, the construction and arrangement of parts shown for effecting this end. It will be further apparent that changes could also be made in the devices which operate the reciprocating coiler and the feeding mechanism, as well also in those in which the parts V and V' are employed. In the latter instance, also, I prefer the form and arrangement shown, since much better results are had from a comparatively limited number of effectively working parts.

In Fig. 4, I have shown an ordinary form of treadle mechanism constituted by the parts marked 20, 21, 22 and 23, but since these form no part of the present invention a more specific reference thereto need not be made. Suffice it to say, however, that as long as the operator maintains the foot-treadle in a downward position the parts of the machine will be caused to receive motion from the drive-shaft, but as soon as the treadle is released the said parts are tripped or thrown out of connection, and the machine stopped.

Having thus described my invention, what I claim as new, and desire to secure by Letters Patent, is—

1. In a machine for making rivets from sheet metal the combination of blank cutting mechanism, blank coiling mechanism, blank swaging mechanism, and means whereby the successive blanks as they are cut are delivered automatically from the cutting to the coiling mechanism, and, after having been coiled, from the coiling to the swaging mechanism—the combination being and acting substantially as set forth.

2. In a machine for making rivets from sheet metal, the combination of blank coiling mechanism, by which the sheet metal blank is rolled up or formed into a coil, with mechanism for swaging the coiled blank into rivet form, and means for delivering the coiled blank from the coiling mechanism to the swaging mechanism, substantially as hereinbefore set forth.

3. The coiling device consisting of the two members Q, 7, overlapping each other to provide inclosing walls for the blank during the progress of the coiling operation, and having opposed concaved shoulders which when brought together form a cylindrical case for the coiled blank—these parts being constructed and arranged for joint operation, substantially as hereinbefore set forth.

4. The pivoted blank holding finger $i^2$, in combination with the coiling device consisting of the two members Q, 7, overlapping each other to provide inclosing walls for the blank during the progress of the coiling operation, and having opposed concaved shoulders which when brought together form a cylindrical case for the coiled blank—the combination being and acting substantially as hereinbefore set forth.

5. In a machine for making tubular or solid rivets, the combination of the vertically-reciprocating blank-cutter, the walking beam to which the upper end of the cutter is suspended, and means for operating said beam from the drive-shaft, the slotted arm having its bearing on said beam, the rod suspended in the slots of said arm, and the springs working in connection with said arm for both maintaining the same downward and then lifting it, substantially as described.

6. In a machine for making tubular or solid rivets, the combination of a vertically-reciprocating blank-cutter, a die therefor, and a blank coiling mechanism the moving member of which reciprocates in a plane beneath said die, substantially as and for the purpose described.

7. In a machine for making tubular or solid rivets, the combination of a vertically-reciprocating blank-cutter, a rod working through said cutter and having a reciprocating movement independent of the same, and a reciprocating coiler which moves in a horizontal plane at right angles to the path of movement of said rod and cutter, substantially as described.

8. In a machine for making tubular or solid rivets, the combination of a vertically-reciprocating blank-cutter, a die therefor, a rod working through said cutter and having a reciprocating movement independent thereof, and a reciprocating coiler which moves horizontally in a plane beneath said die and in a path at right angles to the cutter and rod, substantially as described.

9. In a machine for making tubular or solid rivets, the combination of a vertically-reciprocating blank-cutter, and independently-reciprocating rod working through said cutter, a die for the cutter, and a coiling device for the rivet moving in a plane beneath the die, the said rod having a movement beyond or in excess of the movement of the cutter, substantially as described.

10. In a machine for making tubular or solid rivets, the combination with the vertically-reciprocating blank-cutter, and means for operating the same, of the horizontally-reciprocating coiler formed with the tongue and compound curved portion intersected by the straight rib, and the stationary or fixed coiling member having the recess for receiving the tongue, substantially as described.

11. In a machine for making tubular or solid rivets, the combination with the trough for feeding a strip of sheet metal, and the vertically-reciprocating blank-cutter, of a feeding foot having movable or sliding bearings, a spring for normally retracting or holding said foot back, a lever urging the foot forward on elevation of the cutter, and a spring for restoring the lever when the cutter descends, substantially as described.

12. In a machine for making tubular or solid rivets, the combination with the movable punch having the recessed plate secured to the side of its stock, of the movable feeding-foot, the pivoted bell-crank-lever, one arm of which works in the recessed plate and the other operating against the foot, the restoring spring, and the notched arm forming a stop, substantially as described.

13. In a machine for making tubular or solid rivets, the combination with the vertically-reciprocating blank-cutter, and means for operating the same, of the rod working therein, the slotted lever supporting said rod, and the two springs operating, respectively, to elevate and depress the lever, substantially as described.

14. In a machine for making tubular or solid rivets, the combination of a stationary heading or upsetting die, an ejecting device located on the face thereof for ejecting the finished rivet, and two oppositely opposed reciprocating heads the one carrying a header, and the other a plunger, substantially as described.

15. In a machine for making tubular or solid rivets, the combination with the stationary heading or upsetting die, of the plunger working therein from the rear, a spring surrounding said plunger and interposed between the head of the plunger and said die, and means for reciprocating the plunger, substantially as described.

16. In a machine for making tubular or solid rivets, the combination with the stationary upsetting or heading die, of the spring-actuated lever pivoted to the face thereof and adapted when struck to eject the finished rivet from said die, and the reciprocating head carrying the arm for striking said lever, in the manner shown and described.

17. In a machine for making tubular or solid rivets, the combination with the reciprocating coiler, of the pivoted lever, the two arms of which are in different horizontal planes and united by a sleeve or tube which turns on a common fulcrum, and the grooved cam operating said lever from the shaft, substantially as described.

18. In a machine for making tubular or solid rivets, the combination with the plunger operating behind the rivet, and the head in which said plunger is held, of the rock-shaft located in the front of the machine, the cam carried by said shaft and working in the cam-plate, an eccentric on the end of said shaft, and a connecting rod or pitman connecting said eccentric with the grooved cam on the drive-shaft, substantially as described.

19. In a machine for making tubular or solid rivets, the combination of a vertically-reciprocating blank-cutter, a rod working in said cutter and having a reciprocating movement independent of the same, a horizontally reciprocating coiler, an automatic feed, a die, and a plunger and a header operating from opposite ends of the die in a plane at right angles to the path of the coiler, substantially as described.

Signed this 30th day of November, A. D. 1891.

HENRY S. REYNOLDS.

Witnesses:
ERNEST C. WEBB,
EWELL A. DICK.